(12) United States Patent
Wakana

(10) Patent No.: US 11,836,556 B2
(45) Date of Patent: Dec. 5, 2023

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Toru Wakana, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/853,052

(22) Filed: Jun. 29, 2022

(65) Prior Publication Data
US 2023/0012395 A1    Jan. 12, 2023

(30) Foreign Application Priority Data

Jul. 7, 2021  (JP) ................. 2021-112986

(51) Int. Cl.
| | | |
|---|---|---|
| *G06F 3/12* | (2006.01) | |
| *G06K 15/00* | (2006.01) | |
| *G06K 15/02* | (2006.01) | |
| *G06K 15/16* | (2006.01) | |

(52) U.S. Cl.
CPC ......... *G06K 15/408* (2013.01); *G06K 15/002* (2013.01); *G06K 15/16* (2013.01); *G06K 15/1878* (2013.01); *G06K 15/1881* (2013.01); *G06K 15/4065* (2013.01)

(58) Field of Classification Search
CPC .... G06K 15/408; G06K 15/002; G06K 15/16; G06K 15/1878; G06K 15/1881; G06K 15/4065

See application file for complete search history.

(56) References Cited

U.S. PATENT DOCUMENTS

| | | | | |
|---|---|---|---|---|
| 2002/0118236 A1* | 8/2002 | Uetsuki | ................ | B41J 2/17566 347/7 |
| 2003/0214686 A1* | 11/2003 | Saito | ........................ | H04N 1/56 358/1.9 |
| 2003/0234957 A1* | 12/2003 | Ohara | .................... | G06F 3/1286 358/1.15 |
| 2008/0170254 A1* | 7/2008 | Shah | ...................... | G06F 3/1204 358/1.15 |
| 2008/0232835 A1* | 9/2008 | Ota | ..................... | G03G 15/6508 399/45 |
| 2009/0086295 A1* | 4/2009 | Murakami | ........... | H04N 1/6033 358/518 |

(Continued)

FOREIGN PATENT DOCUMENTS

JP    2006205402 A    8/2006

*Primary Examiner* — Huo Long Chen
(74) *Attorney, Agent, or Firm* — ROSSI, KIMMS & McDOWELL LLP

(57) ABSTRACT

An image forming apparatus includes: an obtaining unit configured to obtain an image; an identification unit configured to identify a type of paper on which the image obtained by the obtaining unit is printed; a gamma correction unit configured to subject the image obtained by the obtaining unit to gamma correction based on the type of the paper identified by the identification unit; a saving unit configured to save the image after being subjected to the gamma correction; and a unit configured to stop printing of the image based on a failure of the identification unit to identify the type of the paper on which the image is printed.

25 Claims, 8 Drawing Sheets

(56) References Cited

U.S. PATENT DOCUMENTS

| | | | |
|---|---|---|---|
| 2013/0335475 A1* | 12/2013 | Yano | B41J 13/0009 |
| | | | 347/16 |
| 2016/0011555 A1* | 1/2016 | Akimoto | G03G 15/502 |
| | | | 399/81 |
| 2016/0231969 A1* | 8/2016 | Kashiwagi | G06F 3/126 |
| 2019/0356816 A1* | 11/2019 | Matsuo | H04N 1/6033 |

\* cited by examiner

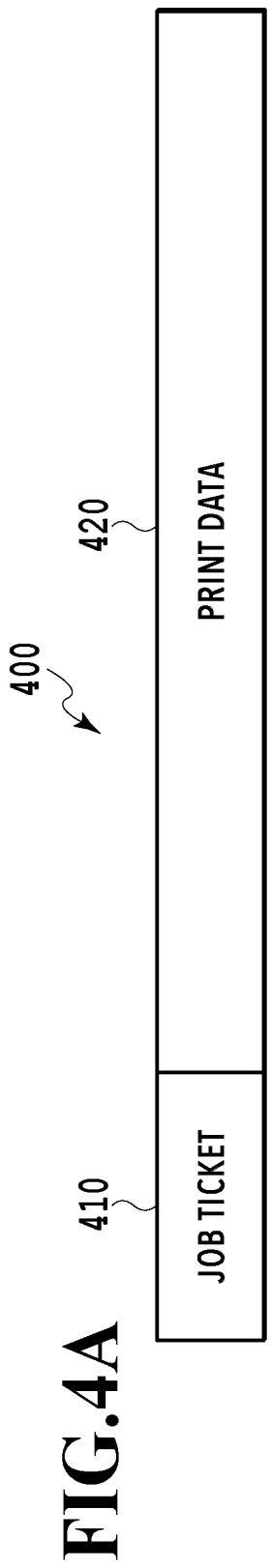
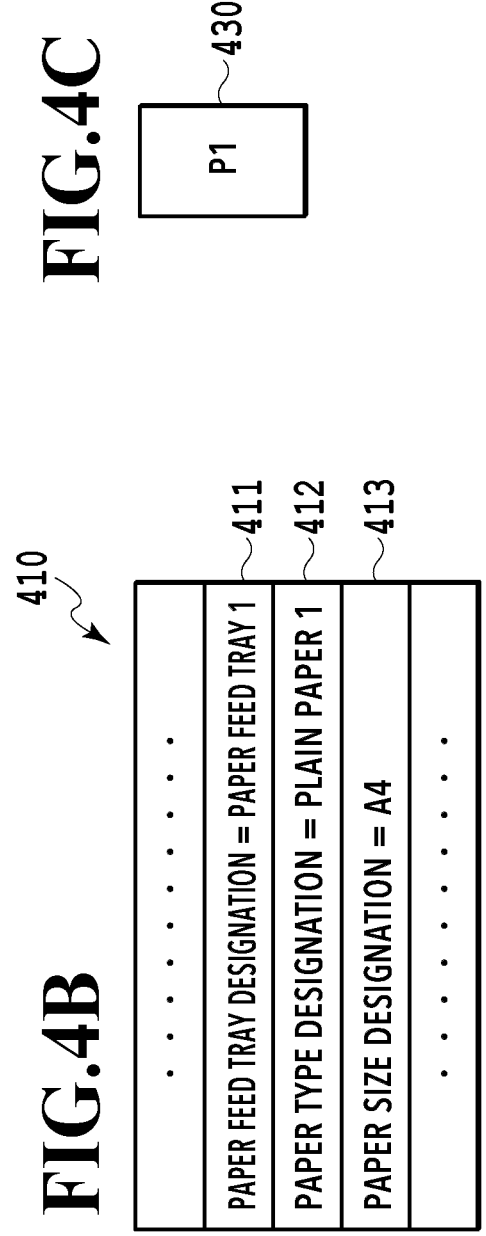
FIG.4A
FIG.4B
FIG.4C

IMAGE FORMING APPARATUS, IMAGE FORMING METHOD, AND STORAGE MEDIUM

BACKGROUND

Field

The present disclosure relates to an image forming apparatus, an image forming method, and a storage medium.

Description of the Related Art

There is an image forming apparatus which prints an image on paper based on a print job received from a host computer or the like. The above-mentioned image forming apparatus interprets PDL data included in the print job, and generates multivalued raster image data being image data of a bitmap format to begin with. Then, printing is carried out based on binary raster image data obtained by subjecting the multivalued raster image data to image processing such as gamma correction and quantization. Meanwhile, there are various types of paper to be printed. In the above-mentioned gamma correction, using a gamma value (a fixed value) as a parameter may result in a phenomenon of a toner not being properly fixed to the paper and coming off easily depending on the type of the paper to be printed. For this reason, the gamma correction has to use an appropriate parameter in conformity to the type of the paper to be printed. Concerning the processing that uses the parameter as mentioned above, Japanese Patent Laid-Open No. 2006-205402 discloses a technique to carry out image processing based on a parameter in conformity to a type of paper designated in a print job in a case where paper of the type coinciding with the designated type of paper is stored in a paper feed tray.

SUMMARY

The present disclosure provides a technique for preventing a printing failure in a case where it is not possible to identify a type of paper to be printed.

An image forming apparatus of an aspect according to the present disclosure includes: an obtaining unit configured to obtain an image; an identification unit configured to identify a type of paper on which the image obtained by the obtaining unit is printed; a gamma correction unit configured to subject the image obtained by the obtaining unit to gamma correction based on the type of the paper identified by the identification unit; a saving unit configured to save the image after being subjected to the gamma correction; and a unit configured to stop printing of the image based on a failure of the identification unit to identify the type of the paper on which the image is printed.

Further features of the present disclosure will become apparent from the following description of exemplary embodiments with reference to the attached drawings.

BRIEF DESCRIPTION OF THE DRAWINGS

FIGS. 4A to 4C are diagrams for describing a print job;

DESCRIPTION OF THE EMBODIMENTS

An image forming apparatus is generally configured to temporarily store (spool) image data for the purpose of preview before a start of printing. There are two types of the image printing apparatus in light of a hardware configuration, namely, a model configured to carry out this spooling by use of multivalued raster image data and a model configured to carry out the spooling by use of binary raster image data.

In the model configured to carry out the spooling by use of the binary raster image data, the type of paper to be printed is unidentified at the time of carrying out the gamma correction. Therefore, the gamma correction would be carried out by using a predetermined gamma value. Accordingly, there was a case where the gamma value used in the gamma correction did not correspond to the type of the paper to be actually printed. Another conceivable case is to use a designated type of paper through a printer driver at the time of carrying out the gamma correction. However, an initial setting value "automatic" of the printer driver is quite often designated as the type of paper. As a consequence, the type of paper is often unidentified in the case of using the printer driver. In a case where the type of paper cannot be identified or the gamma value corresponding to the type of paper is not available at the time of the gamma correction, it is not possible to achieve sufficient density reproducibility depending on the type of paper to printed, thus leading to a failure in outputting a print product in optimum quality. What is more, in a case where a fixing condition of a toner is poor, the toner may come off or the paper may get jammed.

Modes for carrying out the present disclosure will be described below with reference to the drawings. It is to be noted, however, that the constituents disclosed in the following embodiments are merely exemplary and are not intended to limit the scope of the present invention to those constituents. In the meantime, a solution of the present invention does not necessarily require a combination of all of the constituents described in any of the embodiments, and various modifications and changes are possible. The same constituents will be explained while designating the same reference signs.

First Embodiment

Figure 1:
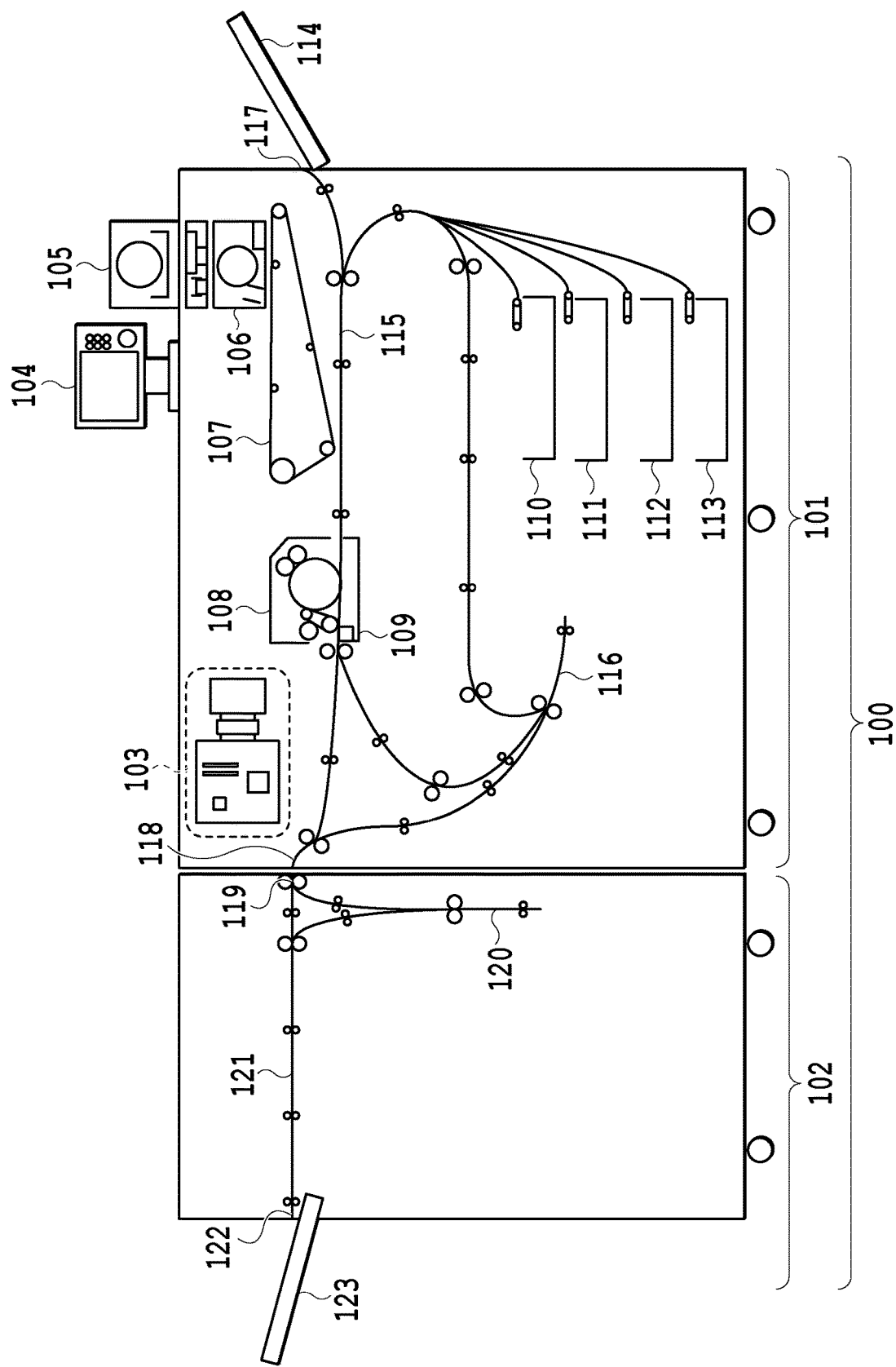
FIG. 1 is a diagram showing a configuration example of an image forming apparatus.

FIG. 1 is a diagram showing a configuration example of an image forming apparatus according to the present embodiment. An image forming apparatus 100 according to the present embodiment includes a printing apparatus 101 and a finisher 102. In the image forming apparatus 100, the printing apparatus 101 forms an image based on a received print job and prints the image on paper (a sheet) by using an electrophotographic method, for example. Meanwhile, the finisher 102 discharges the printed paper.

<Printing Apparatus>

The printing apparatus 101 includes a control unit 103, an operating unit 104, a toner supply unit 105, an image forming unit 106, an intermediate transfer belt 107, a fixing device 108, a paper size detection unit 109, and paper feed devices 110 to 114. The printing apparatus 101 further includes a paper conveyance unit 115, a switchback unit 116, a paper feed slot 117, a paper discharge unit 118, and so forth.

The control unit 103 activates software for performing a variety of control of the image forming apparatus 100. For example, the control unit 103 performs display control for displaying a UI screen on the operating unit 104, and so forth. For instance, the operating unit 104 includes a touch panel, a hardware key, and the like. The operating unit 104 has an input function to accept an instruction (an input operation) to the image forming apparatus 100 by a user operation, and a display function to display information concerning the image forming apparatus 100. The toner supply unit 105 supplies a toner serving as a printing agent to the image forming unit 106 of the image forming apparatus 100. The toner supply unit 105 is provided with an openable/closable door (not shown). A user can supply the toner to the toner supply unit 105 by opening the openable/closable door.

Using the toner supplied from the toner supply unit 105, the image forming unit 106 forms a toner image on a photoconductor drum in accordance with an instruction in print data, and transfers the toner image to the intermediate transfer belt 107. The intermediate transfer belt 107 transfers the toner image by the intermediary of a secondary transfer roller to paper that is sent from one of the paper feed devices 110 to 114, details of which will be described later, to the paper conveyance unit 115. The fixing device 108 applies heat and pressure to the paper to which the toner image is transferred, thereby fixing the toner image to the paper and forming the image.

The paper size detection unit 109 detects a size of the paper (hereinafter also referred to as a paper size) to which the toner image is fixed by the fixing device 108, for example.

The paper feed devices 110 to 114 are trays that contain paper in predetermined paper sizes to be supplied to the paper conveyance unit 115, respectively. Here, in each of the paper feed devices 110 to 113, the paper is taken out of and fed into the device by allowing an operator to open and close a paper feed port. In the paper feed device 114, the paper is fed into the device by allowing the operator to place the paper on a paper feed port. Here, the paper feed devices 110, 111, 112, 113, and 114 are also referred to as a first paper feed tray, a second paper feed tray, a third paper feed tray, a fourth paper feed tray, and a manual feed tray, respectively.

The paper conveyance unit 115 conveys the paper supplied from any of the first paper feed tray 110, the second paper feed tray 111, the third paper feed tray 112, the fourth paper feed tray 113, and the manual feed tray 114 being the paper feed devices to a transfer unit or the fixing device 108. The switchback unit 116 turns over the paper with the image formed on its first surface, and conveys the paper again to the transfer unit in order to form another image on a second surface of the paper. The paper feed slot 117 accepts the paper which is fed from the manual feed tray 114 being an external paper feed device. The paper discharge unit 118 discharges the paper subjected to fixation processing to the finisher 102.

<Finisher>

The finisher 102 includes a feed slot 119, a switchback unit 120, a conveyance unit 121, a discharge unit 122, a discharge tray 123, and the like. The finisher 102 that includes these devices subjects the paper printed by the printing apparatus 101 to a finishing process, and discharges the paper subjected to the finishing process to the discharge tray 123. Examples of the finishing process include stapling, punching, saddle stitch binding, and the like.

The feed slot 119 of the finisher 102 receives the paper discharged from the printing apparatus 101. The switchback unit 120 is an inversion mechanism that turns over the paper. The conveyance unit 121 conveys the paper sent either from the feed slot 119 or the switchback unit 120 of the finisher 102 to the discharge tray 123. The discharge unit 122 discharges the paper conveyed by the conveyance unit 121. The discharge tray 123 loads the paper discharged from the discharge unit 122.

<Control Unit of Image Forming Apparatus>

Figure 2:
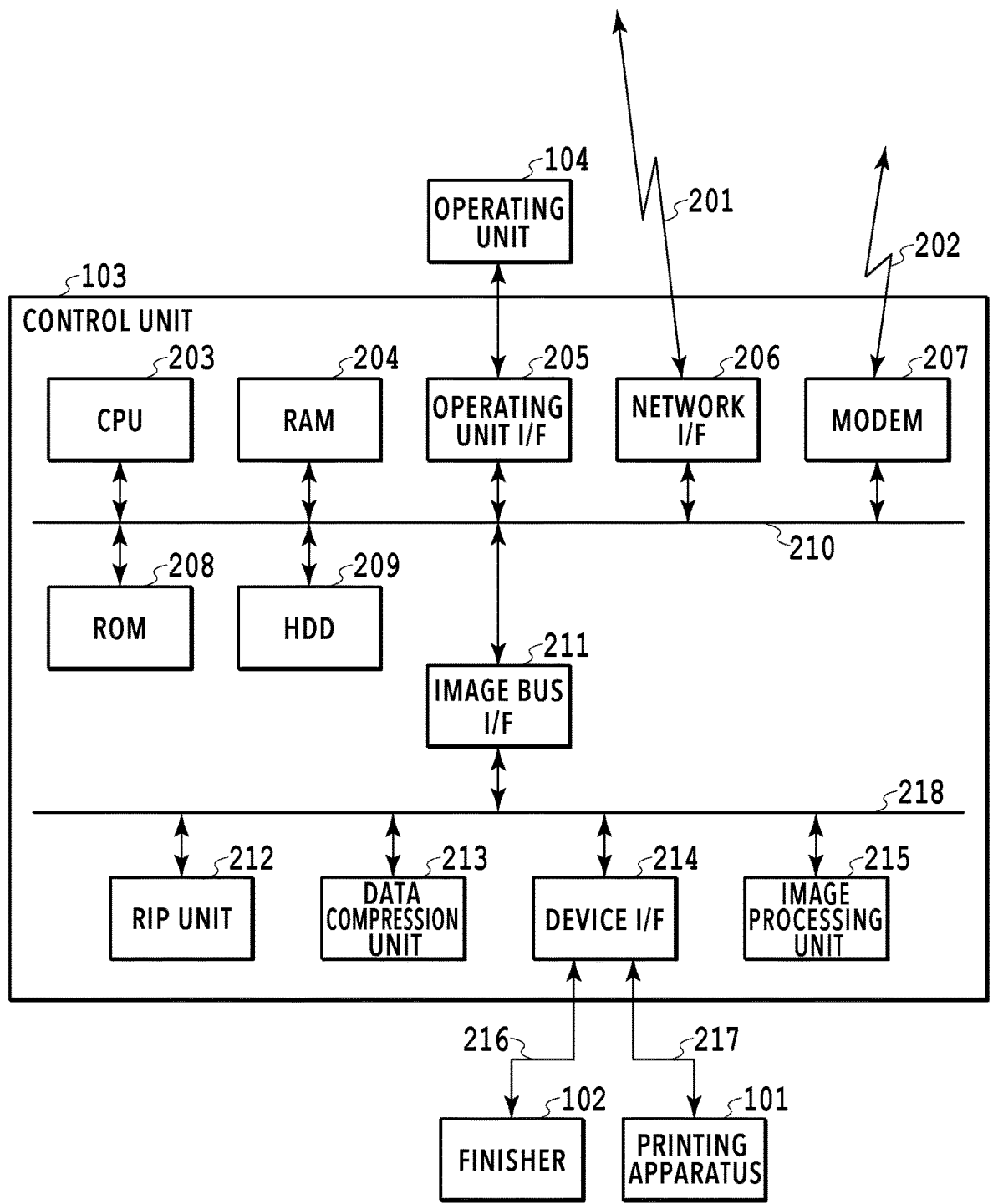
FIG. 2 is a block diagram showing a configuration of a control unit of the image forming apparatus.

FIG. 2 is a block diagram showing a configuration example of the control unit 103 of the image forming apparatus 100 according to the present embodiment. The control unit 103 includes a CPU 203, a RAM 204, an operating unit I/F 205, a network I/F 206, a MODEM 207, a ROM 208, and an HDD 209. The CPU 203, the RAM 204, the operating unit I/F 205, the network I/F 206, the MODEM 207, the ROM 208, and the HDD 209 are connected to a system bus 210 and are capable of transmitting and receiving data to and from one another. The control unit 103 further includes a rasterization (raster image processor, or RIP) unit 212, a data compression unit 213, a device I/F 214, and an image processing unit 215. The RIP unit 212, the data compression unit 213, the device I/F 214, and the image processing unit 215 are connected to an image bus 218 and are capable of transmitting and receiving data to and from one another. The system bus 210 and the image bus 218 mentioned above are connected to each other through an image bus I/F 211 and are capable of transmitting and receiving data to and from each other.

The CPU 203 is a central processing unit that operates a program for controlling the entire control unit 103. The RAM 204 is managed by the program operated on the CPU 203. The RAM (random access memory) 204 is used as a reception buffer that temporarily stores data received from external devices. Moreover, the RAM 204 is used as an image data buffer that temporarily stores image data subjected to rasterization (RIP) by the RIP unit 212. In other words, the RAM 204 stores the temporary data in process. The operating unit I/F (interface) 205 is connected to the operating unit 104, and sends signals from the operating unit 104 to the respective units. The network I/F 206 receives data from an external device (not shown) through a network 201, and stores the data in the HDD 209. The MODEM 207 receives data from another external device (not shown) through a telephone line 202, and stores the data in the HDD 209. The ROM (read only memory) 208 is a storage unit that stores programs to be operated on the CPU 203 as well as data and the like. The hard disk drive (HDD) 209 is a non-volatile storage device that can store various data for a long time.

The system bus 210 is connected to the CPU 203, the RAM 204, the operating unit I/F 205, the network I/F 206, the MODEM 207, the ROM 208, and the HDD 209, which enables the respective constitutes to transmit and receive data to and from one another.

The image bus I/F 211 is an interface to connect the system bus 210 to the image bus 218 in the printing apparatus 101. The image bus I/F 211 enables communication between the system bus 210 side where control system software is operated and modules concerning image processing which are operated on the image bus 218.

The RIP unit 212 converts PDL data inputted from outside into raster image data, which is bitmap-format image data. The data compression unit 213 compresses the bitmap-format image data and the like. The device I/F 214 connects the printing apparatus 101 and the finisher 102 to the image bus 218 through data buses 216 and 217, so as to enable the printing apparatus 101 and the finisher 102 to transmit and receive data to and from each other.

The image processing unit 215 carries out a variety of image processing on the raster image data, which is the bitmap-format image data generated by the RIP unit 212. The image processing unit 215 has a function to convert multivalued raster image data (contone image data) into binary raster image data (halftone image data). To be more precise, the image processing unit 215 subjects the multi-valued (N-valued) raster image data to gamma correction by using an image processing parameter (a gamma value). Then, the image processing unit 215 generates the binary raster image data by half-toning the image data subjected to the gamma correction, and stores the generated binary raster image data in the RAM 204. Note that the above-mentioned processing to conduct half-toning (halftone processing) is also referred to as quantization processing. In the meantime, although the above-mentioned processing to conduct half-toning is described as the processing to convert the raster image data from the multivalued data into the binary data, the present invention is not limited only to this configuration. For example, in the above-mentioned processing to conduct half-toning, the raster image data may be converted from the multivalued (N-valued) data into M-valued data such as 4-valued data that is smaller than the N-value. The binary raster image data is also regarded as M-valued halftone image data smaller than the multivalued raster image data.

The CPU 203 carries out printing while issuing commands for conducting the printing to the printing apparatus 101 and the finisher 102 through the data buses 216 and 217 in accordance with an instruction signal from the operating unit 104 or from an external device through the network 201.

<Method of Setting Controlling Method in Case of Unidentified Paper Type>

Figure 3:
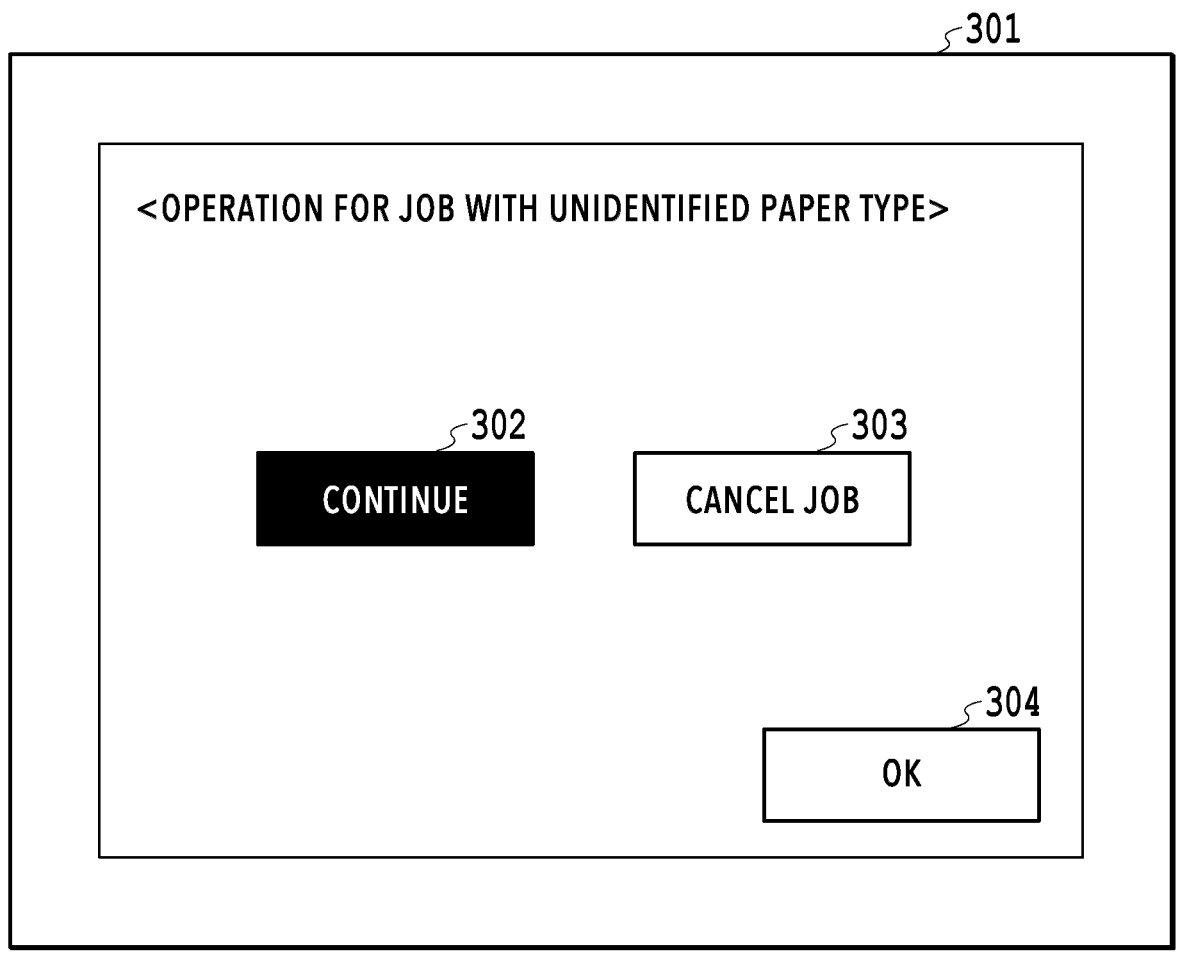
FIG. 3 is a diagram showing an example of a UI screen for setting a controlling method in a case where a paper type is unidentified.

Now, a method of setting a controlling method in a case of an unidentified paper type where it is not possible to identify a type of paper (hereinafter also referred to as the paper type) from the above-mentioned print job, will be described with reference to FIG. 3. FIG. 3 is a diagram showing an example of a UI screen for setting the controlling method in a case where the paper type is unidentified. In the present embodiment, a setting screen is assumed to be displayed on the operating unit 104. Note that the location to display the setting screen is not limited to the foregoing. For example, the setting screen may be displayed on an external device connected through a network and the like.

A setting screen 301 is a UI screen used for setting the controlling method in the case where the paper type cannot be identified from the print job and the paper type is therefore unidentified. Since the setting screen 301 is the UI screen used for setting the controlling method in the case where the paper type is unidentified, the setting screen 301 is also regarded as a UI screen used for setting an operation for the print job in the case of the unidentified paper type (an operation for a job with an unidentified paper type). The setting screen 301 includes a "continue" key 302 to carry out continuation setting to continue the print job, a "cancel job" key 303 for carrying out job cancellation setting to cancel the print job, and an "OK" key 304.

The "continue" key 302 is a key used for setting "continuation" as the "operation for the job with the unidentified paper type". In the case where the "OK" key 304 is pressed in a state of selecting the "continue" key 302 by a user operation, the "continuation" is registered as the controlling method in the case of the unidentified paper type. Accordingly, the continuation is obtained as a result of determination of the controlling method in the processing in S704 to be described later in detail, and the processing goes to S705.

The "cancel job" key 303 is a key used for setting "cancellation of the job" as the "operation for the job with the unidentified paper type". In the case where the "OK" key 304 is pressed in a state of selecting the "cancel job" key 303 by a user operation, the "cancellation of the job" is registered as the controlling method in the case of the unidentified paper type. Accordingly, the discontinuation is obtained as a result of determination of the controlling method in the processing in S704 to be described later in detail, and the processing goes to S711.

The setting screen 301 shown in FIG. 3 indicates that the "continuation" is selected as the operation for the job with the unidentified paper type by highlighting the "continue" key 302. Meanwhile, the setting screen 301 indicates that the "cancellation of the job" is selected as the operation for the job with the unidentified paper type in the case where the "cancel job" key 303 is highlighted.

Meanwhile, in the case where the "OK" key 304 is pressed by a user operation, the state of setting on the setting screen 301 is enabled and the setting screen 301 is closed at the same time.

<Print job>

Next, the above-mentioned print job will be described with reference to FIGS. 4A to 4C. FIGS. 4A to 4C are diagrams for describing the print job according to the present embodiment. FIG. 4A shows a data structure example of the print job. FIG. 4B shows a configuration example of a job ticket included in the print job of FIG. 4A. FIG. 4C shows an output example by the print job of FIG. 4A.

In the present embodiment, the print job is assumed to be PDL data inputted from a host computer (not shown) or the like through the network 201. Note that the print job is not limited to the job inputted from outside. For example, the print job may be a copying job to carry out a copying operation to print an image on paper, which is based on scanned image data obtained by reading with a reading device (not shown) provided to the printing apparatus 101. Alternatively, the job may be a saving job to temporarily save the scanned image data or the image data sent from the outside into the RAM 204 or the HDD 209, and then to print an image on paper which is based on the image data read out as needed, for example. Note that each of the copying job and the saving job includes a job ticket and data corresponding to a job as with a print job 400.

The print job 400 includes a job ticket 410 and print data 420. Pieces of information including paper feed tray designation information 411, paper type designation information 412, paper size designation information 413, and the like are assumed to be set to the job ticket 410. The paper feed tray that contains the paper to be fed is designated in the paper feed tray designation information 411. In other words, the paper feed tray designation information 411 is also regarded as setting of a designated paper feed tray being the paper feed tray that is designated. The type of the paper to be printed is designated in the paper type designation information 412. The size of the paper to be printed is designated in the paper size designation information 413. In other words, the paper size designation information 413 is also regarded as setting of a designated paper size being the paper size that is designated. The job ticket 410 shown in FIG. 4B indicates the designation of "paper feed tray 1" being the first paper feed tray as the paper feed tray, "plain paper 1" as the paper type, and "A4" as the paper size. In the present embodiment, the job ticket 410 is assumed to be described in a job control language.

The print data 420 is PDL data described in a page description language, for example. The print data 420 includes image data for each page. Here, a print product 430 to be described later in detail consists of one page. Accordingly, the print data 420 includes the image data for the one page.

In the present embodiment, the paper feed tray designation information 411 is assumed to be capable of designating any of the paper feed trays of "automatic", "paper feed tray 1", "paper feed tray 2", "paper feed tray 3", "paper feed tray 4", and "manual feed tray". Note that the paper feed trays that can be designated by the paper feed tray designation information 411 are not limited to the foregoing, and the applicable paper feed tray only needs to be one of paper feed trays that can be set as a target paper feed tray by the printing apparatus 101. The "automatic" mode in the paper feed tray designation information 411 represents a mode to automatically set the paper feed tray. To be more precise, the "automatic" mode in the paper feed tray designation information 411 indicates a mode to automatically set the paper feed tray or the like that feeds the paper in the paper size coinciding with the paper size set to the paper size designation included in the job ticket. The "paper feed tray 1", "paper feed tray 2", "paper feed tray 3", and "paper feed tray 4" modes indicate modes to set the first paper feed tray 110, the second paper feed tray 111, the third paper feed tray 112, and the fourth paper feed tray 113, respectively, which are provided to the printing apparatus 101. The "manual feed tray" mode indicates a mode to set the manual feed tray 114.

Meanwhile, the paper type designation information 412 is assumed to be capable of setting any of the paper types of "automatic", "plain paper 1", "plain paper 2", "plain paper 3", "coated paper 1", "coated paper 2", "envelope", and "postcard". Note that the paper types that can be set to the paper type designation information 412 are not limited to the foregoing, and the applicable paper type only needs to be one of paper types that can be set as an image formation target (a printing target) by the printing apparatus 101. The "automatic" mode in the paper type designation information 412 represents a mode of automatically setting the paper type.

To be more precise, the "automatic" mode in the paper type designation information 412 indicates a mode to automatically set the paper feed tray or the like coinciding with the paper feed tray and the paper size set to the paper feed tray designation and the paper size designation included in the job ticket. The "plain paper 1", "plain paper 2", "plain paper 3", "coated paper 1", "coated paper 2", "envelope", and "postcard" modes show modes to set plain paper 1 plain paper 2, plain paper 3, coated paper 1, coated paper 2, an envelope, and a postcard, respectively, as the paper type of the image formation target.

In the meantime, the paper size designation information 413 is assumed to be capable of setting any of the paper sizes of "A4"(210 mm×297 mm), "A3"(297 mm×420 mm), "JIS N3"(120 mm×235 mm), and "postcard"(100 mm×148.5 mm). Note that the paper sizes that can be set to the paper size designation information 413 are not limited to the foregoing, and the applicable paper size only needs to be one of paper sizes that can be set as the image formation target (the printing target) by the printing apparatus 101. The "A4", "A3", "JIS N3", and "postcard" modes show modes to set A4, A3, JIS N3, and the postcard, respectively, as the paper size of the image formation target.

In the case where the printing apparatus 101 receives the print job 400 shown in FIG. 4A, the printing apparatus 101 outputs the print product 430 consisting of one page in the A4 size based on the print data 420 included in print job 400 as shown in FIG. 4C, for example.

<Image Processing Parameter>

Figure 5:
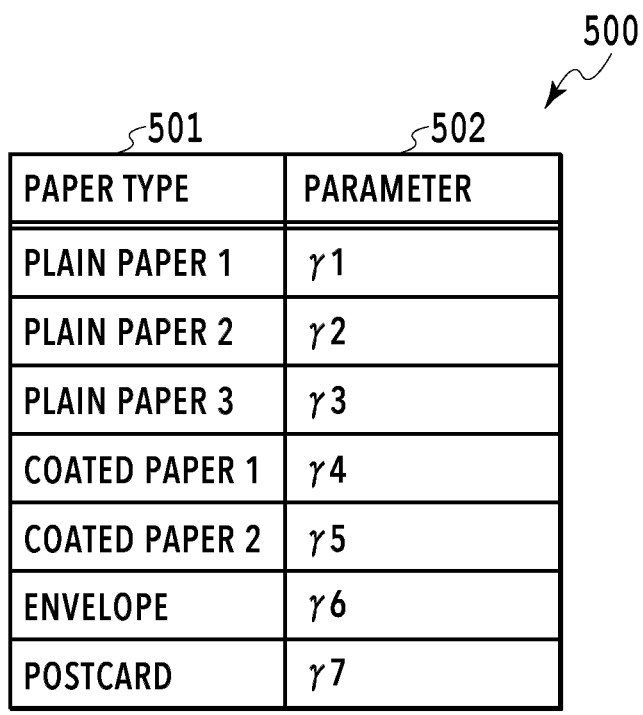
FIG. 5 is a diagram showing examples of an image processing parameter set for respective paper types.

Now, a relation between the above-described paper type and the image processing parameter (the gamma value) will be described with reference to FIG. 5. FIG. 5 is a diagram showing examples of the image processing parameters set for the respective paper types. An image processing parameter list 500 is a table which shows that gamma values shown in a column for parameters (image processing parameters) 502 are set to the respective paper types shown in a column for paper types 501. The image processing parameters (gamma values) 502 are the parameters used in the case where the image processing unit 215 carries out the gamma correction on the multivalued raster image data which is the bitmap-format image data generated by the RIP unit 212. Here, the image processing parameters (the gamma values) are assumed to preset for the respective paper types.

The image processing parameters 502 "γ1", "γ2", and "γ3" are set so as to correspond to the paper types 501 "plain paper 1", "plain paper 2", and "plain paper 3", respectively. The image processing parameters 502 "γ4" and "γ5" are set so as to correspond to the paper types 501 "coated paper 1" and "coated paper 2", respectively. The image processing parameters 502 "γ6" and "γ7" are set so as to correspond to the paper types 501 "envelope" and "postcard", respectively.

Note that the information shown in FIG. 5 is assumed to be stored in the HDD 209, for example.

<Setting Information>

Figure 6A:
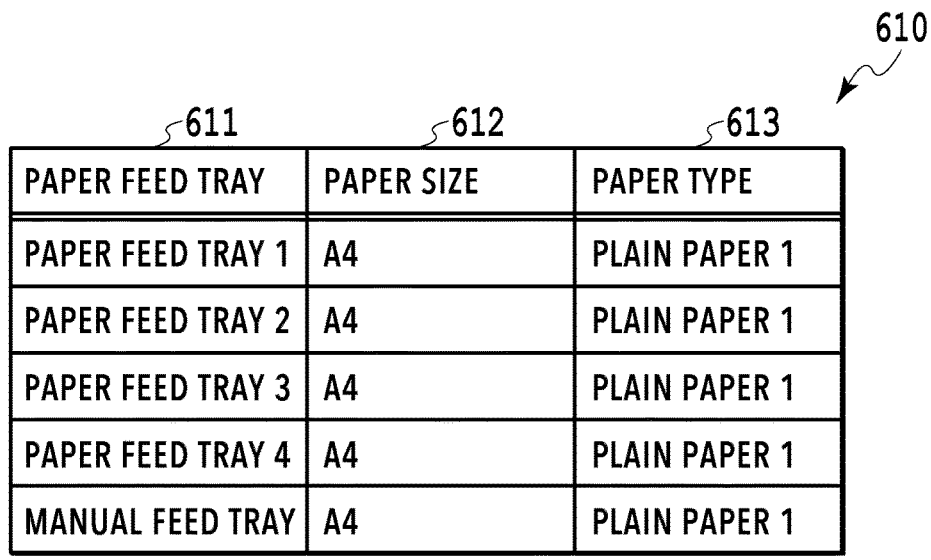
FIGS. 6A and 6B are diagrams showing examples of setting information set for respective paper feed trays.
Figure 6B:
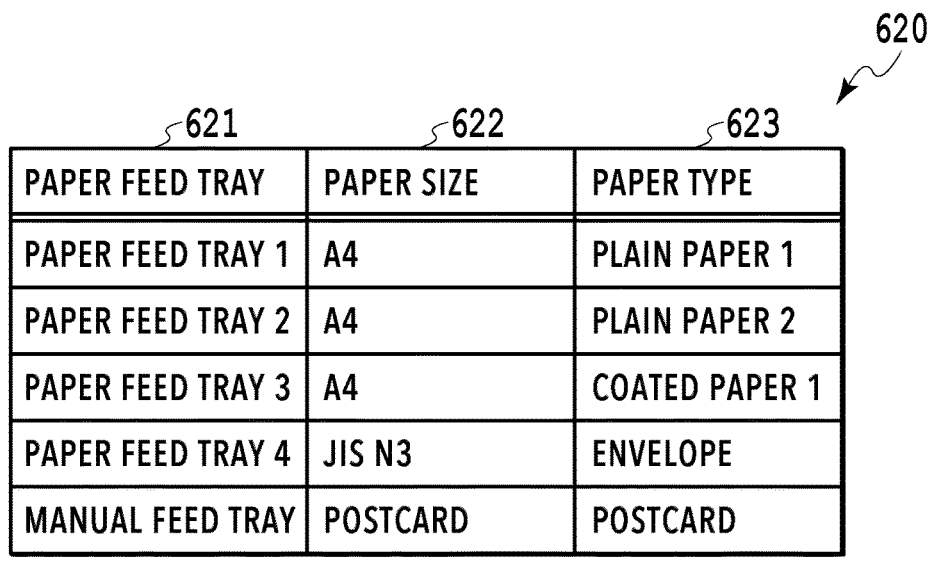

Now, an example of information (setting information) concerning the paper contained in the respective paper feed trays will be described with reference to FIGS. 6A and 6B. FIGS. 6A and 6B are diagrams showing examples of setting information set for the respective paper feed trays. FIG. 6A shows a case where the paper types of all of the paper feed trays are the same, while FIG. 6B shows a case where the paper types are different among the paper feed trays.

Setting information 610 is information represented in the form of a table, which indicates that each paper feed tray designated in a column of paper feed trays 611 contains the paper corresponding to information in a column of paper sizes 612 and in a column of paper types 613.

The "paper feed tray 1", "paper feed tray 2", "paper feed tray 3", "paper feed tray 4", and "manual feed tray" in the column of the paper feed trays 611 show that these trays contain the paper having the paper size 612 "A4" and the paper type 613 "plain paper 1".

As mentioned earlier, the setting information 610 is set in such a way as to associate each piece of the information on the paper feed tray 611 with the corresponding piece of information on the paper size 612 and with the corresponding piece of information on the paper type 613. Note that the setting information shown in FIG. 6A is assumed to be stored in the RAM 204.

Setting information 620 is information represented in the form of a table, which indicates that each paper feed tray designated in a column of paper feed trays 621 contains the paper corresponding to information in a column of paper sizes 622 and in a column of paper types 623.

The "paper feed tray 1" in the column of the paper feed trays 621 shows that this tray contains the paper corresponding to the information indicating the paper size 622 "A4" and the paper type 623 "plain paper 1". The "paper feed tray 2" in the column of the paper feed trays 621 shows that this tray contains the paper corresponding to the information indicating the paper size 622 "A4" and the paper type 623 "plain paper 2". The "paper feed tray 3" in the column of the paper feed trays 621 shows that this tray contains the paper corresponding to the information indicating the paper size 622 "A4" and the paper type 623 "coated paper 1". The "paper feed tray 4" in the column of the paper feed trays 621 shows that this tray contains the paper corresponding to the information indicating the paper size 622 "JIS N3" and the paper type 623 "envelope". The "manual feed tray" in the column of the paper feed trays 621 shows that this tray contains the paper corresponding to the information indicating the paper size 622 "postcard" and the paper type 623 "postcard".

As mentioned earlier, the setting information 620 is set in such a way as to associate each piece of the information on the paper feed tray 621 with the corresponding piece of information on the paper size 622 and with the corresponding piece of information on the paper type 623 as with the setting information 610. Note that the setting information shown in FIG. 6B is assumed to be stored in the RAM 204.

<Print Processing Based on Print Job>

Figure 7:
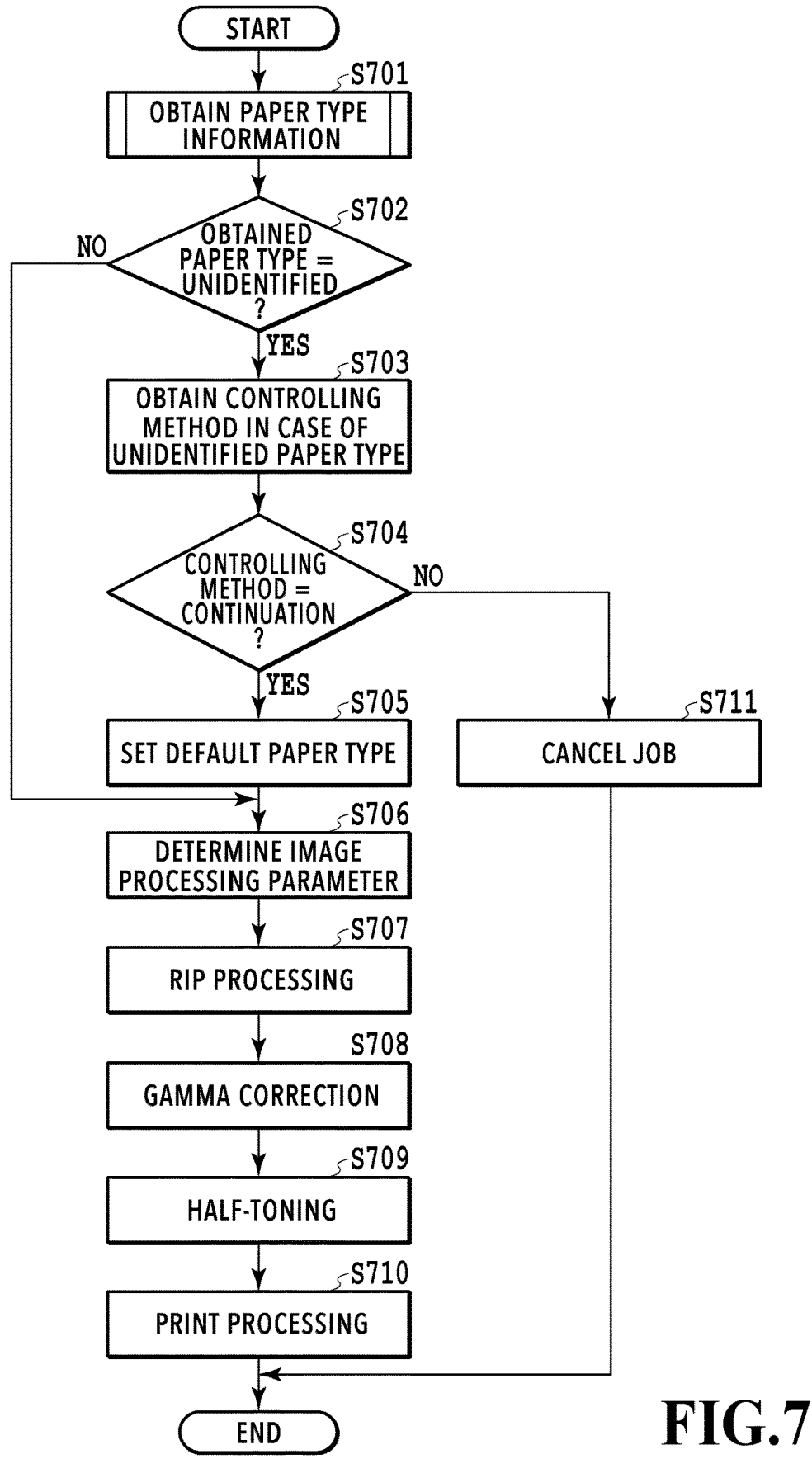
FIG. 7 is a flowchart showing a flow of processing executed by the image forming apparatus.

Next, print processing based on the print job will be described with reference to FIG. 7. FIG. 7 is a flowchart showing a flow of processing executed by the image forming apparatus according to the present embodiment. The series of processing shown in the flowchart of FIG. 7 is carried out by causing the CPU to load program codes stored in the ROM into the RAM and to execute the program codes. Meanwhile, part or all of functions of the steps in FIG. 7 may be implemented by using hardware such as an ASIC and an electronic circuit. Note that a sign "S" in an explanation of each processing represents a step in the flowchart. The same applies to a subsequent flowchart. The present embodiment is assumed to handle a case of processing the PDL data as the print job. Moreover, the above-mentioned print job is assumed to be received from a host computer or the like (not shown) through the network 201, and the job ticket and the print data included in the received print job are assumed to be stored in the HDD 209. In other words, the image forming apparatus is assumed to have obtained the image. In the meantime, the setting information concerning the paper contained in each paper feed tray is assumed to be stored in the RAM 204.

In S701, the CPU 203 executes processing to obtain paper type information that indicates the paper type of the paper to be fed (to be printed). For example, the CPU 203 reads the pieces of designation information 411 to 413 set to the job ticket of the print job from the HDD 209, and reads the setting information 610 or 620 that indicates the paper types of the paper stored in the paper feed trays 110 to 114 from the RAM 204. Then, the CPU 203 carries out the processing to obtain the paper type information of the paper to be fed by using the pieces of designation information 411 to 413 as well as the setting information 610 or 620 thus read out. However, the paper type information is set to be unidentified in the case where it is not possible to obtain the paper type information of the paper to be fed. Note that details of the processing to obtain the paper type information will be described later in detail with reference to FIG. 8. By executing the processing to obtain the paper type information used at the time of printing prior to print processing (S710 to be described later) as described above, it is possible to determine the image processing parameter (the gamma value) corresponding to the paper type before carrying out the gamma correction. In other words, the type of the paper on which to print the image is identified in S701.

In S702, the CPU 203 determines whether or not the paper type information obtained in S701 is unidentified. The processing goes to S703 in the case of obtaining a result of determination that the obtained paper type information is unidentified (YES in S702). On the other hand, the processing goes to S706 in the case of obtaining a result of determination that the obtained paper type information is not unidentified (NO in S702). Here, the paper type information which is not unidentified according to the present embodiment is assumed to be the information that sets any of the paper types feedable by the image forming apparatus 100. Meanwhile, the paper types feedable by the image forming apparatus 100 according to the present embodiment are assumed to be the "plain paper 1", the "plain paper 2", the "plain paper 3", the "coated paper 1", the "coated paper 2", the "envelope", and the "postcard". In other words, in S702, it is determined whether or not the paper type is identified.

In S703, the CPU 203 carries out processing for determining the controlling method in the case where the paper type is unidentified (hereinafter referred to as the controlling method to be applied to the unidentified paper type). First, the CPU 203 obtains a setting value of the controlling method to be applied to the unidentified paper type from the HDD 209. Here, the controlling method to be applied to the unidentified paper type is assumed to be predetermined by using the setting screen "operation for job with unidentified paper type" shown in FIG. 3 through the operating unit 104, for example, and this setting value is assumed to be stored in the HDD 209.

In S704, the CPU 203 determines whether or not the setting value of the controlling method to be applied to the unidentified paper type has a value "continuation". The processing goes to S705 in the case of obtaining a result of determination that the setting value of the controlling method to be applied to the unidentified paper type has the value "continuation" (YES in S704). On the other hand, the processing goes to S711 in the case of obtaining a result of determination that the setting value of the controlling method to be applied to the unidentified paper type does not have the value "continuation" (NO in S704).

In S705, the CPU 203 sets a default paper type to the paper type to be used at the time of determining the image processing parameter in S706 to be described later. This setting is carried out because the operation for the job with the unidentified paper type is set to continuation although the paper type information obtained in S701 turns out to be the unidentified state. The default paper type is assumed to be a default value which is preset to the image forming apparatus 100, for example. Here, the default paper type is assumed to be stored in the HDD 209 and to be read out of the HDD 209. In the present embodiment, the "plain paper 1" is assumed to be set to the default paper type.

In S706, the CPU 203 determines the image processing parameter corresponding to the paper type information based on the paper type information obtained in S701 or on the paper type information set in S705. In other words, the image processing parameter corresponding to the paper type information is thus settled. In the present embodiment, the image processing parameter is assumed to be the gamma value (the parameter) used in the gamma correction. Here, a relation between the paper type information and the image processing parameter (the gamma value) is assumed to be defined in advance. In the present embodiment, an image processing parameter list that shows the relations between the paper type information and the image processing parameters is assumed to be set as shown in FIG. 5 and to be stored in the HDD 209, for example. Accordingly, the image processing parameter mapped to the determined paper type information is read out of the HDD 209, and the image processing parameter thus read out is determined as the image processing parameter corresponding to the paper type information. The determined image processing parameter is stored in the RAM 204.

In S707, the CPU 203 causes the RIP unit 212 to carry out RIP processing and thus to generate the image data. First, the PDL data in the print data 420 of the print job 400 is analyzed and converted into intermediate data (not shown) based on a result of analysis, and the intermediate data is stored in the HDD 209. Thereafter, the above-mentioned intermediate data is read out of the HDD 209 and the image data (not shown) is generated by using the RIP unit 212. The generated image data is stored in the HDD 209. Here, the above-mentioned image data (not shown) is assumed to be the multivalued raster image data (the contone image data).

In S708, the CPU 203 reads the multivalued raster image data (not shown) out of the HDD 209. In addition, the CPU 203 reads the image processing parameter (the gamma value) determined in S706 out of the RAM 204. The CPU 203 subjects the multivalued raster image data to the gamma correction by using the above-mentioned image processing parameter.

In S709, the CPU 203 carries out half-toning (conversion into the binary data) on the raster image data after the gamma correction obtained in the processing in S708 while using an arbitrary image processing method, thereby generating the binary raster image data (the halftone image data). Then, the CPU 203 stores the generated binary raster image data in the HDD 209. Specifically, the generated halftone image data is spooled. The spooled image data is the image data after being subjected to the gamma correction, which is also said to be the image data after being subjected to the half-toning. Meanwhile, the above-mentioned image processing method is assumed to be an error diffusion method. Note that the above-mentioned image processing method is not limited to the error diffusion method and other publicly known techniques may be used instead.

In S710, the CPU 203 reads the binary raster image data, which is generated and spooled in S709, out of the HDD 209. Then, the binary raster image data read out of the HDD 209 is converted into a video signal (not shown), and printing based on the video signal is carried out on the paper fed from the paper feed tray. In other words, an image based on the binary raster image data is printed on the paper fed from the paper feed device.

In S711, the CPU 203 carries out processing to discontinue control of the print job. In other words, the image printing is discontinued in S711. The control of the print job is discontinued as mentioned above because the paper type information obtained in S701 is in the unidentified state and the operation for the job with the unidentified paper type is set to cancellation of the job. Since the cancellation of the job is carried out as mentioned above, the CPU 203 is regarded as performing the control to stop the printing of the image based on the failure to identify the type of the paper on which the image is printed.

The flow shown in FIG. 7 is terminated in the case where the above-described processing in S710 or S711 is completed.

As described with reference to FIG. 7, the processing based on the print job is controlled depending on a result of the processing to obtain the paper type information (a result of identification).

Although the above description has been made by using the print job received through the network and the like, the present invention is not limited only to this configuration. For example, the print job may be any of the copying job and the saving job described above, in which the print processing is carried out by using the paper type information obtained from the job ticket of the print job.

<Processing to Obtain Paper Type Information>

Figure 8:
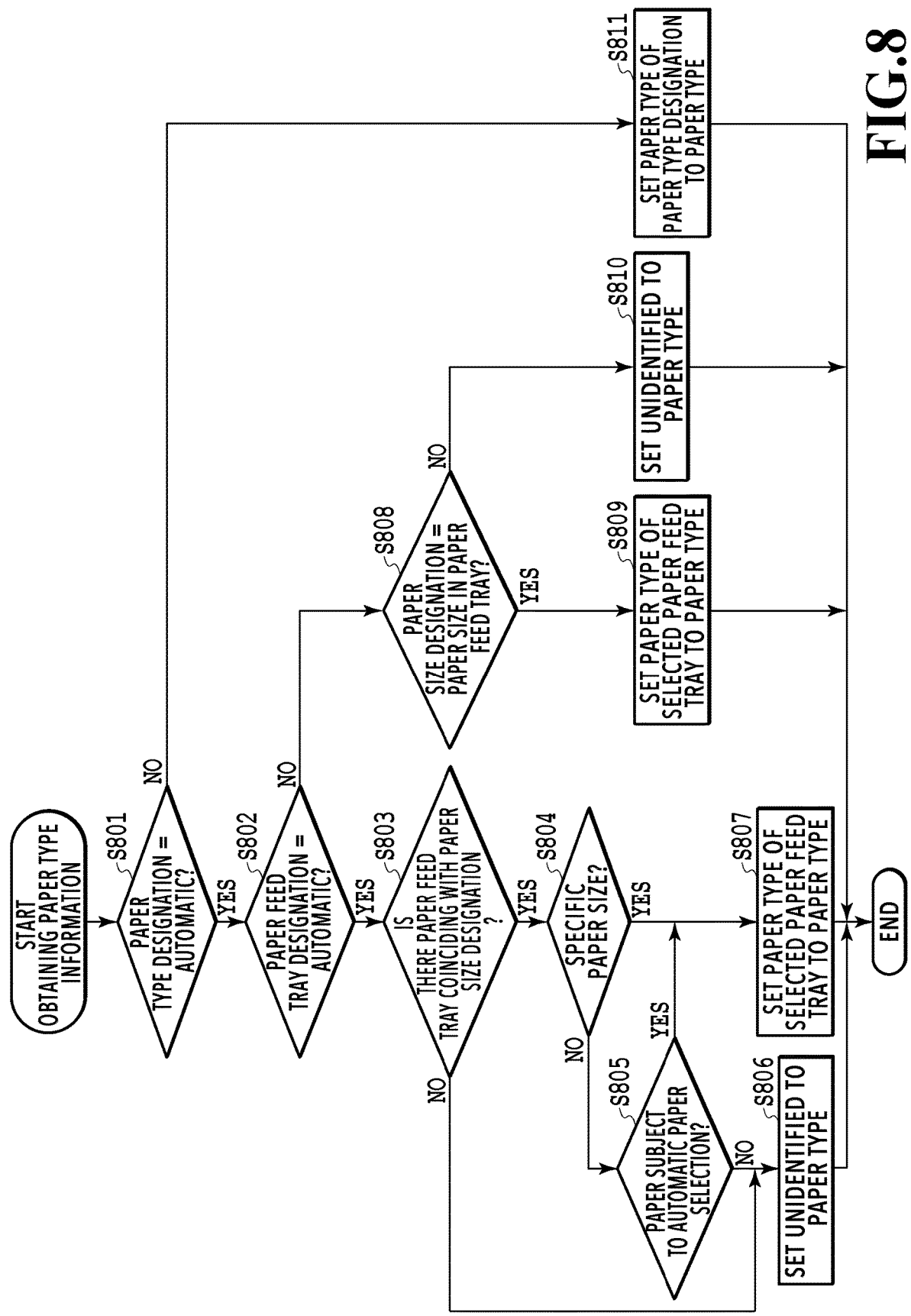
FIG. 8 is a flowchart showing a detailed flow of processing to obtain paper type information.

A detailed flow of the above-mentioned processing to obtain the paper type information executed in S701 will be described with reference to FIG. 8. FIG. 8 is a flowchart showing a detailed flow of the processing to obtain the paper type information.

In S801, the CPU 203 determines whether or not it is possible to identify the paper type based on a value designating the paper type. First, the CPU 203 reads the value designating the paper type which is set to the job ticket 410 of the print job 400 out of the HDD 209. Then, the CPU 203 determines whether or not the value designating the paper type thus read out is "automatic". Here, the value designating the paper type is assumed to be any of "automatic" and the paper types feedable by the image forming apparatus 100. The paper types feedable by the image forming apparatus 100 according to the present embodiment are assumed to be the "plain paper 1", the "plain paper 2", the "plain paper 3", the "coated paper 1", the "coated paper 2", the "envelope", and the "postcard". The processing goes to S802 in the case of obtaining a result of determination that the read value designating the paper type is "automatic" (YES in S801). On the other hand, the processing goes to S811 in the case of obtaining a result of determination that the read value designating the paper type is not "automatic" but is a value other than "automatic" (NO in S801).

In S802, the CPU 203 determines whether or not it is possible to identify the paper type based on the value designating the paper feed tray. This determination processing is carried out because it is not possible to identify the paper type information from the value (automatic) designating the paper type. First, the CPU 203 reads the value designating the paper feed tray which is set to the job ticket 410 of the print job 400 out of the HDD 209. Then, the CPU 203 determines whether or not the value designating the paper feed tray thus read out is "automatic". Here, the value designating the paper feed tray is assumed to be any of "automatic" and the paper feed trays included in the image forming apparatus 100. The image forming apparatus 100 according to the present embodiment is assumed to include the "paper feed tray 1", the "paper feed tray 2", the "paper feed tray 3", the "paper feed tray 4", and the "manual feed tray". The processing goes to S803 in the case of obtaining a result of determination that the read value designating the paper feed tray is "automatic" (YES in S802). On the other hand, the processing goes to S808 in the case of obtaining a result of determination that the read value designating the paper feed tray is not "automatic" but is a value other than "automatic" (NO in S802).

In S803, the CPU 203 carries out processing to determine the paper type information based on the value designating the paper size. This processing is carried out because it is not possible to identify the paper type information from the value (automatic) designating the paper type or from the value (automatic) designating the paper feed tray. To be more precise, the CPU 203 determines where or not there is the paper feed tray among the paper feed trays 110 to 114 embedded in the image forming apparatus 100, which contains the paper having the paper size coinciding with the value designating the paper size. First, the CPU 203 reads the value designating the paper size, which is set to the job ticket 410 of the print job 400, out of the HDD 209. Here, the value designating the paper size is assumed to be any of the paper sizes feedable by the image forming apparatus 100. The image forming apparatus 100 according to the present embodiment is assumed to be able to feed "A4, "A3", "JIS N3" and "postcard". Next, the CPU 203 reads the information on the paper sizes of the paper contained in the respective paper feed trays 110 to 114 out of the RAM 204. Here, the setting information shown in FIG. 6A or the setting information shown in FIG. 6B is assumed to be stored in the RAM 204. The CPU 203 determines whether or not there is the paper feed tray among the paper feed trays 110 to 114 in the image forming apparatus 100, which contains the paper having the paper size coinciding with the read value designating the paper size. Here, the order (the order of priorities) of the paper feed trays to be determined is assumed to be preset. In the case where there are two or more paper feed trays that contain the paper in the coincident paper size, then the paper feed tray is supposed to be determined in accordance with the aforementioned order. Specifically, in a case where the setting information sets two or more paper feed trays that feed prescribed paper coinciding with prescribed paper designated in the relevant designation information, then one of the paper feed trays is determined in accordance with the predetermined order of priorities. In the present embodiment, the first paper feed tray 110 is assumed to be set to the highest priority, and the order of priorities is assumed to be preset in such a way as to be gradually lowered in the order of the first paper feed tray 110, the second paper feed tray 111, the third paper feed tray 112, the fourth paper feed tray 113, and the manual feed tray 114. For example, in the case where the paper types of the paper contained in the respective paper feed trays 110 to 114 are as shown in FIG. 6A, the first paper feed tray 110 is selected on a top-priority basis. Meanwhile, the second paper feed tray 111 will be selected in case the paper to be fed from the first paper feed tray 110 is depleted. Incidentally, the order of priorities is not limited to the aforementioned order. Thereafter, the processing goes to S804 in the case of obtaining a result of determination that there is the paper feed tray that contains the paper having the paper size coinciding with the value designating the paper size (YES in S803). On the other hand, the processing goes to S806 in the case of obtaining a result of determination that there is no paper feed tray that contains the paper having the paper size coinciding with the value designating the paper size (NO in S803).

In S804, the CPU 203 determines whether or not the value designating the paper size represents a specific paper size. In other words, a determination is made as to whether or not the relevant paper has the specific paper size. In the present embodiment, the specific paper size is assumed to be any of the size representing the "JIS N3" (envelop) and the size presenting the "postcard". In other words, the specific paper sizes are assumed to be the envelope size and the postcard size. Here, a reason for determining whether or not the value represents the specific paper size is that it is possible to determine the "envelope" as the paper type in the case where the paper size is the "JIS N3", or to determine the "postcard" as the paper type in the case where the paper size is the "postcard". Although the present embodiment has described the case where the envelope and the postcard are defined as the specific paper sizes, the present invention is not limited only to this configuration. Paper other than the envelope and the postcard may be treated as the paper having the specific paper size as long as it is possible to determine the paper type of that paper based on the paper size. The processing goes to S805 in the case of obtaining a result of determination that the value designating the paper size does not represent the specific paper size (NO in S804). On the other hand, the processing goes to S807 in the case of obtaining a result of determination that the value designating the paper size represents the specific paper size (YES in S804).

In S805, the CPU 203 determines whether or not the paper type of the paper contained in the paper feed tray coinciding with the value designating the paper size is a paper type subject to automatic selection. The paper type subject to automatic selection is assumed to be determined in advance, and a commonly used paper type is set to this paper type so as to avoid automatic feeding of paper that is not commonly used. In the present embodiment, the paper subject to automatic selection is assumed to be the "plain paper 1", the "plain paper 2", and the "plain paper 3". In a case where the status of the paper contained in the respective paper feed trays 110 to 114 is as shown in FIG. 6A, for example, then all of the paper feed trays 110 to 114 are subject to automatic selection. On the other hand, in a case where the status of the paper contained in the respective paper feed trays 110 to 114 is as shown in FIG. 6B, then the first paper feed tray 110 and the second paper feed tray 111 are subject to automatic selection. The processing goes to S806 in the case of obtaining a result of determination that the paper type of the paper contained in the paper feed tray coinciding with the value designating the paper size is not the paper type subject to automatic selection (NO in S805). On the other hand, the processing goes to S807 in the case of obtaining a result of determination that the paper type of the paper contained in the paper feed tray coinciding with the value designating the paper size is the paper type subject to automatic selection (YES in S805).

In S806, the CPU 203 sets "unidentified" to the paper type information used in processing to determine the image processing parameter, and stores the paper type information set to the "unidentified" in the RAM 204, because this is a state in which the paper that satisfies the paper tray designation, the paper type designation, and the paper size designation set to the job ticket 410 of the print job 400 is not present in any of the paper feed trays 110 to 114, and the identification of the paper type ends up in failure.

In S807, the CPU 203 sets the paper type of the paper contained in the paper feed tray to the paper type information used in the processing to determine the image processing parameter. Specifically, the CPU 203 sets the paper type of the paper in the selected paper feed tray to the paper type information. Then, the CPU 203 stores the set paper type information in the RAM 204, because this is a state in which the paper that satisfies the paper tray designation, the paper type designation, and the paper size designation set to the job ticket 410 of the print job 400 is present in any of the paper feed trays 110 to 114, and the identification of the paper type is successful.

In S808, the CPU 203 determines whether or not the paper size of the paper contained in the paper feed tray designated by the value designating the paper feed tray coincides with the value designating the paper size. First, the CPU 203 reads the value designating the paper size which is set to the job ticket 410 of the print job 400 out of the HDD 209. Next, the CPU 203 reads the paper sizes of the paper contained in the paper feed trays from the RAM 204. Here, the setting information shown in FIG. 6A or the setting information shown in FIG. 6B is assumed to be stored in the RAM 204. Then, the CPU 203 determines whether or not the value designating the paper size coincides with any of the values of the paper sizes of the paper contained in the paper feed trays. The processing goes to S809 in the case of obtaining a result of determination that the value designating the paper size coincides with any of the values of the paper sizes of the paper contained in the paper feed trays (YES in S808). On the other hand, the processing goes to S810 in the case of obtaining a result of determination that the value designating the paper size coincides with none of the values of the paper sizes of the paper contained in the paper feed trays (NO in S808).

In S809, the CPU 203 sets the paper type of the paper contained in the paper feed tray to the paper type information used in the processing to determine the image processing parameter as with S807. Specifically, the CPU 203 sets the paper type of the paper in the selected paper feed tray to the paper type information. Then, the CPU 203 stores the set paper type information in the RAM 204, because this is the state in which the paper that satisfies the paper tray designation, the paper type designation, and the paper size designation set to the job ticket 410 of the print job 400 is present in any of the paper feed trays 110 to 114, and the identification of the paper type is successful.

In S810, the CPU 203 sets "unidentified" to the paper type information used in the processing to determine the image processing parameter, and stores the paper type information set to the "unidentified" in the RAM 204 as with S806, because this is the state in which the paper that satisfies the paper tray designation, the paper type designation, and the paper size designation set to the job ticket 410 of the print job 400 is not present in any of the paper feed trays 110 to 114, and the identification of the paper type ends up in failure.

In S811, the CPU 203 sets the value designating the paper type to the paper type information used in the processing to determine the image processing parameter. Specifically, the CPU 203 sets the paper type of the paper type designation to the paper type information. Then, the CPU 203 stores the set paper type information in the RAM 204, because this is a state in which the value designating the paper type is determined to be a value other than the value "automatic", and the identification of the paper type is successful by using the value designating the paper type.

The flow shown in FIG. 8 is terminated in the case where any of the above-described processing in S806, S807, S809, S810, and S811 is completed.

As described above, according to the present embodiment, it is possible to cancel the print processing (image formation processing) based on the print job in the case where it is not possible to obtain the information for determining the image processing parameter (the gamma value) and to identify the paper type at the time of rasterization. In other words, the print job can be cancelled before the RIP unit 212 starts the generation of the N-valued raster image data in the case where it is not possible to identify the paper type of the paper to be printed. Accordingly, execution of processing which is highly likely to cause a print failure can be withheld so as to reduce wasting of the paper.

Other Embodiments

The input image may be PDF instead of the PDL data.
The above description has been given by using the image processing parameter list 500 in which the image processing parameters (the gamma values) are preset for the respective paper types. However, the present invention is not limited to the foregoing, and the paper types may be combined with information other than the paper types. For example, the paper types may be combined with information on at least any of resolutions and the paper sizes of contone images. In the case where the paper type information is combined with the information on at least any of the resolutions and the paper sizes of the contone images, the information (not shown) concerning the resolutions and the paper sizes is assumed to be described in the job ticket 410 of the print job 400 shown in FIG. 4B, for example.

The above description has been given of the processing to obtain the paper type information based on the paper size of the paper. However, the present invention is not limited to the foregoing. For example, the paper type information may be obtained based on paper of a specific type such as a cardboard, coated paper, an OHP sheet, and a film. In the case where the paper type information is obtained based on the paper of the specific type, the information (not shown) concerning the paper of the specific type is assumed to be described in the job ticket 410 of the print job 400 shown in FIG. 4B, for example. Meanwhile, the image processing parameters corresponding to the paper of the specific types are assumed to be preset in the image processing parameter list 500 shown in FIG. 5. In the flowchart shown in FIG. 8, the determination takes place in S803, S804, S808, and the like in terms of the paper of the specific types instead of the paper sizes.

The above description has been given of the case where the CPU 203 carries out the control to discontinue the printing of the image in S711 concerning the stop of printing the image based on the failure to identify the type of the paper on which to print the image. However, the present invention is not limited to the foregoing. For example, the following control may take place instead of cancelling the job in S711. Specifically, the CPU 203 may suspend the printing of the image and store the corresponding print job in the HDD 209. Thereafter, the CPU 203 may carry out control to read the print job stored in the HDD and to resume the suspended printing of the image at a stage where the type of the paper on which to print the image is identified and conditions for resumption are ready.

The above description has been given of the case where the flow shown in FIG. 7 is terminated on the condition that the cancellation of the job is executed. However, the present invention is not limited to the foregoing. For example, a warning screen indicating the cancellation of the print job may be displayed either on the operating unit or on a display device of the information processing apparatus used by the user after executing the cancellation of the job, and the warning display may be cleared in the case of pressing an OK button in the warning screen.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present embodiment, it is possible to prevent a printing failure in a case where it is not possible to identify a type of paper to be printed.

This application claims the benefit of Japanese Patent Application No. 2021-112986, filed Jul. 7, 2021, which is hereby incorporated by reference wherein in its entirety.

What is claimed is:

1. An image forming apparatus comprising:
a memory configured to store instructions; and
a processor configured to execute the stored instructions to function as:
  an obtaining unit configured to obtain an image;
  an identification unit configured to identify a type of paper on which the image obtained by the obtaining unit is printed;
  a gamma correction unit configured to subject the image obtained by the obtaining unit to gamma correction based on the type of the paper identified by the identification unit;
  a saving unit configured to save the image after being subjected to the gamma correction;
  a discontinuation unit configured to stop printing of the image based on a failure of the identification unit to identify the type of the paper on which the image is printed;
  a control unit configured to control execution of an inputted print job, wherein the control unit is configured to cause the discontinuation unit to discontinue the printing of the image by cancelling the execution of the print job in a case of a failure to identify the type of the paper based on the print job;
  an image generating unit configured to subject the image to quantization processing and to generate a halftone image; and
  a printing unit configured to carry out the printing by using the halftone image,
wherein the obtaining unit is configured to obtain an N-valued raster image generated by interpreting PDL data included in the print job,
wherein the gamma correction unit is configured to subject the N-valued raster image obtained by the obtaining unit to the gamma correction,
wherein the image generating unit is configured to generate an M-valued halftone image by subjecting the N-valued raster image after being subjected to the gamma correction to the quantization processing, the value M being smaller than the value N,
wherein the saving unit is configured to save the M-valued halftone image generated by the image generating unit, and
wherein the printing unit is configured to carry out the printing by using the M-valued halftone image saved by the saving unit.

2. The image forming apparatus according to claim 1, wherein the saving unit is configured to save the image after being subjected to the gamma correction and further being subjected to halftone processing.

3. The image forming apparatus according to claim 1, wherein the processor is further configured to execute the stored instructions to function as:
  a paper feeding unit configured to feed the paper; and
  a unit configured to obtain setting information concerning the paper feeding unit included in the image forming apparatus, a type of the paper fed by the paper feeding unit, and a size of the paper fed by the paper feeding unit,
wherein the print job includes designation information to designate a type of paper to be printed, a size of the paper to be printed, and the paper feeding unit to feed the paper to be printed, respectively, and
wherein the control unit is configured to control the execution of the print job based on the setting information and the designation information.

4. The image forming apparatus according to claim 3, wherein the control unit is configured to cause the discontinuation unit to discontinue the printing of the image by cancelling the execution of the print job in the case of the failure to identify the type of the paper based on the print job, on a condition that the designation information does not designate a prescribed type of paper and a prescribed paper feeding unit, and on a condition that the setting information does not set the paper feeding unit that feeds prescribed paper designated in the designation information.

5. The image forming apparatus according to claim 3, wherein the control unit is configured to cause the discontinuation unit to discontinue the printing of the image by cancelling the execution of the print job in the case of the failure to identify the type of the paper based on the print job, on a condition that the designation information does not designate a prescribed type of paper and a prescribed paper feeding unit, and on a condition that the setting information sets the paper feeding unit that feeds prescribed paper designated in the designation information but the prescribed paper designated in the designation information is neither specific paper nor paper set to be subject to automatic selection in the setting information.

6. The image forming apparatus according to claim 5, wherein the specific paper is any of paper in a specific size and paper of a specific type.

7. The image forming apparatus according to claim 6, wherein the paper in the specific size is paper in any of an envelope size and a postcard size.

8. The image forming apparatus according to claim 6, wherein the paper of the specific type is any of a cardboard, coated paper, an OHP sheet, and a film.

9. The image forming apparatus according to claim 3, wherein the control unit is configured to cause the discontinuation unit to discontinue the printing of the image by cancelling the execution of the print job in the case of the failure to identify the type of the paper based on the print job, on a condition that the designation information does not designate a prescribed type of paper but designates a prescribed paper feeding unit, and on a condition that prescribed paper fed by the designated paper feeding unit is different from prescribed paper fed by the paper feeding unit set to the setting information.

10. The image forming apparatus according to claim 1, wherein the control unit is configured to execute the print job in a case where the type of the paper is successfully identified based on the print job.

11. The image forming apparatus according to claim 10, wherein the processor is further configured to execute the stored instructions to function as:
a paper feeding unit configured to feed the paper; and
a unit configured to obtain setting information concerning the paper feeding unit included in the image forming apparatus, a type of the paper fed by the paper feeding unit, and a size of the paper fed by the paper feeding unit,
wherein the print job includes designation information to designate a type of paper to be printed, a size of the paper to be printed, and the paper feeding unit to feed the paper to be printed, respectively, and
wherein the control unit is configured to control the execution of the print job based on the setting information and the designation information.

12. The image forming apparatus according to claim 11, wherein the control unit is configured to successfully identify the type of the paper based on the print job and execute the print job, on a condition that the designation information does not designate a prescribed type of paper and a prescribed paper feeding unit, and on a condition that the setting information sets the paper feeding unit which feeds prescribed paper designated in the designation information and the prescribed type of paper designated in the designation information is specific paper.

13. The image forming apparatus according to claim 12, wherein
in a case where the setting information sets a plurality of the paper feeding units configured to feed prescribed paper coinciding with the prescribed paper designated in the designation information, one of the paper feeding units is determined in accordance with a predetermined order of priorities.

14. The image forming apparatus according to claim 11, wherein the control unit is configured to successfully identify the type of the paper based on the print job and execute the print job, on a condition that the designation information does not designate a prescribed type of paper and a prescribed paper feeding unit, and on a condition that the setting information sets the paper feeding unit which feeds prescribed paper designated in the designation information and the prescribed paper designated in the designation information is not specific paper but is paper set to be subject to automatic selection in the setting information.

15. The image forming apparatus according to claim 11, wherein the control unit is configured to successfully identify the type of the paper based on the print job and execute the print job, on a condition that the designation information does not designate a prescribed type of paper but designates a prescribed paper feeding unit, and on a condition that prescribed paper fed by the designated paper feeding unit is identical to prescribed paper fed by the paper feeding unit set to the setting information.

16. The image forming apparatus according to claim 11, wherein the control unit is configured to successfully identify the type of the paper based on the print job and execute the print job on a condition that the designation information designates a prescribed type of paper.

17. The image forming apparatus according to claim 1, wherein the processor is further configured to execute the stored instructions to function as:
a setting unit configured to set an operation for the print job in the case of the failure to identify the type of the paper.

18. The image forming apparatus according to claim 17, wherein the processor is further configured to execute the stored instructions to function as:
a display control unit configured to display a UI screen for setting the operation for the print job in the case of the failure to identify the type of the paper, and
wherein the setting unit is configured to set the operation for the print job in the case of the failure to identify the type of the paper, based on a user operation via the UI screen.

19. The image forming apparatus according to claim 18, wherein the UI screen includes setting to cancel the print job and setting to execute the print job by using a parameter corresponding to a predetermined type of the paper as the operation for the print job in the case of the failure to identify the type of the paper.

20. The image forming apparatus according to claim 1, wherein the print job is described in a page description language.

21. The image forming apparatus according to claim 1, wherein the print job is described in a job control language.

22. The image forming apparatus according to claim 1, wherein the print job is a copying job to print the image on the paper based on image data obtained by reading with a reading device.

23. The image forming apparatus according to claim 1, wherein the print job is a saving job to temporarily store image data to be printed into a storage device.

24. An image forming method comprising:
an obtaining step of obtaining an image;
an identifying step of identifying a type of paper on which the image obtained in the obtaining step is printed;
a gamma-correcting step of subjecting the image obtained in the obtaining step to gamma correction based on the type of the paper identified in the identifying step;
a saving step of saving the image after being subjected to the gamma correction; and
a stopping step of stopping printing of the image based on a failure in the identifying step to identify the type of the paper on which the image is printed;
a controlling step of controlling execution of an inputted print job, and stopping the printing of the image by cancelling the execution of the print job in a case of a failure to identify the type of the paper based on the print job;
an image generating step of subjecting the image to quantization processing and generating a halftone image; and
a printing step of carrying out the printing by using the halftone image,
wherein the obtaining step includes obtaining an N-valued raster image generated by interpreting PDL data included in the print job,
wherein the gamma-correcting step includes subjecting the N-valued raster image obtained in the obtaining step to the gamma correction,
wherein the image generating step includes generating an M-valued halftone image by subjecting the N-valued raster image after being subjected to the gamma correction to the quantization processing, the value M being smaller than the value N, wherein the saving step includes saving the M-valued halftone image generated by the image generating step, and wherein the printing step includes carrying out the printing by using the M-valued halftone image saved in the saving step.

25. A non-transitory computer readable storage medium storing a program for causing a computer to perform an image forming method, the image forming method comprising:

an obtaining step of obtaining an image;

an identifying step of identifying a type of paper on which the image obtained in the obtaining step is printed;

a gamma-correcting step of subjecting the image obtained in the obtaining step to gamma correction based on the type of the paper identified in the identifying step;

a saving step of saving the image after being subjected to the gamma correction; and a stopping step of stopping printing of the image based on a failure in the identifying step to identify the type of the paper on which the image is printed;

a controlling step of controlling execution of an inputted print job, and stopping the printing of the image by cancelling the execution of the print job in a case of a failure to identify the type of the paper based on the print job;

an image generating step of subjecting the image to quantization processing and generating a halftone image; and a printing step of carrying out the printing by using the halftone image, wherein the obtaining step includes obtaining an N-valued raster image generated by interpreting PDL data included in the print job, wherein the gamma-correcting step includes subjecting the N-valued raster image obtained in the obtaining step to the gamma correction, wherein the image generating step includes generating an M-valued halftone image by subjecting the N-valued raster image after being subjected to the gamma correction to the quantization processing, the value M being smaller than the value N, wherein the saving step includes saving the M-valued halftone image generated by the image generating step, and wherein the printing step includes carrying out the printing by using the M-valued halftone image saved in the saving step.

* * * * *